US012561029B2

(12) United States Patent (10) Patent No.: US 12,561,029 B2
Liao et al. (45) Date of Patent: Feb. 24, 2026

(54) TOUCH PANEL

(71) Applicant: PIXART IMAGING INC., Hsin-Chu (TW)

(72) Inventors: Chi-Chieh Liao, Hsin-Chu (TW); Chih-Wei Huang, Hsin-Chu (TW); Che-Chia Hsu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 18/788,166

(22) Filed: Jul. 30, 2024

(65) Prior Publication Data

US 2026/0037088 A1 Feb. 5, 2026

(51) Int. Cl.
*G06F 3/041* (2006.01)
*G06F 3/044* (2006.01)

(52) U.S. Cl.
CPC ........ *G06F 3/04182* (2019.05); *G06F 3/0446* (2019.05); *G06F 2203/04107* (2013.01)

(58) Field of Classification Search
CPC .... G06F 2203/041–04114; G06F 2203/04107; G06F 3/04182
See application file for complete search history.

(56) References Cited

U.S. PATENT DOCUMENTS

| | | | | |
|---|---|---|---|---|
| 2019/0302921 | A1* | 10/2019 | Chen | G06F 3/044 |
| 2020/0004368 | A1* | 1/2020 | Kim | G06F 3/04164 |
| 2021/0048906 | A1* | 2/2021 | Zhong | G06F 3/04164 |
| 2022/0413677 | A1* | 12/2022 | Zhang | G06F 3/0443 |

* cited by examiner

*Primary Examiner* — Sanjiv D. Patel

(74) *Attorney, Agent, or Firm* — Li & Cai Intellectual Property Office

(57) ABSTRACT

A touch panel includes a carrier, a first metal structure, and a second metal structure, the latter two of which are respectively disposed on two opposite sides of the carrier. The first metal structure includes a sensing electrode layer and a driving electrode layer that is spaced apart from the sensing electrode layer. The second metal structure includes a first shielding layer and a second shielding layer. A first projection region defined by orthogonally projecting the first shielding layer onto the first metal structure is overlapped with M % of area of the sensing electrode layer. The second shielding layer has a plurality of distribution holes. A second projection region defined by orthogonally projecting the second shielding layer onto the first metal structure is overlapped with N % of area of the driving electrode layer, and M and N are positive numbers and different from each other.

18 Claims, 9 Drawing Sheets

TOUCH PANEL

FIELD OF THE DISCLOSURE

The present disclosure relates to a touch-control device, and more particularly to a touch panel.

BACKGROUND OF THE DISCLOSURE

In order to improve an anti-interference property, a conventional touch panel is designed to increase a covering density of a shielding layer formed on a board thereof. However, this can often lead to an imbalance in the metal content on two opposite sides of the board, which may cause a warpage issue.

SUMMARY OF THE DISCLOSURE

In response to the above-referenced technical inadequacies, the present disclosure provides a touch panel for effectively improving on the issues associated with conventional touch panels.

In order to solve the above-mentioned problems, one of the technical aspects adopted by the present disclosure is to provide a touch panel, which includes a carrier, a first metal structure and a second metal structure. The carrier has a first surface and a second surface that is opposite to the first surface. The first metal structure is disposed on the first surface of the carrier. Moreover, a portion of the first surface connected to the first metal structure has a first distribution area. The first metal structure includes a sensing electrode layer and a driving electrode layer that is spaced apart from the sensing electrode layer. The second metal structure is disposed on the second surface of the carrier. Moreover, a portion of the second surface connected to the second metal structure has a second distribution area. The second metal structure includes a first shielding layer and a second shielding layer. Moreover, a plurality of distribution holes are formed in the second shielding layer.

In one of the possible or preferred embodiments, the carrier has a plurality of thru-holes penetrating from the first surface to the second surface and includes a plurality of conductive pillars respectively arranged in the thru-holes. The second metal structure includes a circuit layer that is spaced apart from the first shielding layer and the second shielding layer. Two ends of each of the conductive pillars are respectively connected to the driving electrode layer and the circuit layer.

In one of the possible or preferred embodiments, the driving electrode layer includes a plurality of driving electrodes spaced apart from each other, and each of the conductive pillars is connected to one of the driving electrodes. The circuit layer includes a plurality of connection circuits, and each of the connection circuits is connected to two of the conductive pillars so as to electrically couple two of the driving electrodes that are connected to the two of the conductive pillars.

In one of the possible or preferred embodiments, a plurality of isolation holes are formed in the second shielding layer, and each of the connection circuits is arranged in one of the isolation holes so as to be spaced apart from the first shielding layer and the second shielding layer.

In one of the possible or preferred embodiments, the first shielding layer is partially connected to the second shielding layer, and the first shielding layer defines a partial boundary of at least one of the distribution holes.

In one of the possible or preferred embodiments, the first metal structure and the second metal structure are made of a same material, and a thickness of the first metal structure along the thickness direction is equal to a thickness of the second metal structure along the thickness direction.

In one of the possible or preferred embodiments, the sensing electrode layer defines a plurality of enclosed regions that are spaced apart from each other, and the first metal structure includes a plurality of counterweight pads respectively arranged in the enclosed regions. Each of the counterweight pads is not in contact with the sensing electrode layer, and each of the counterweight pads corresponds in position to at least one of the distribution holes along the thickness direction.

In one of the possible or preferred embodiments, the distribution holes include a plurality of complete holes and a plurality of incomplete holes. Areas of the complete holes are identical to each other, and an area of each of the incomplete holes is less than the area of any one of the complete holes.

In one of the possible or preferred embodiments, the second metal structure defines a plurality of predetermined hole positions, which include a plurality of first positions, a plurality of second positions each having two parts, and a plurality of third positions. The complete holes are respectively formed at the first positions. One of the two parts of each of the second positions is located at the first shielding layer, and another one of the two parts of each of the second positions is formed with one of the incomplete holes. The third positions are located at the first shielding layer.

In one of the possible or preferred embodiments, the predetermined hole positions are spaced apart from each other by a same distance along a first direction, and the predetermined hole positions are spaced apart from each other by the same distance along a second direction perpendicular to the first direction.

In order to solve the above-mentioned problems, another one of the technical aspects adopted by the present disclosure is to provide a touch panel, which includes a carrier, a first copper structure, and a second copper structure. The carrier has a first surface and a second surface that is opposite to the first surface. The first copper structure is disposed on the first surface of the carrier. Moreover, a portion of the first surface connected to the first copper structure has a first distribution area. The first copper structure includes a first conductive layer and a second conductive layer that is spaced apart from the first conductive layer. The second copper structure is disposed on the second surface of the carrier. Moreover, a portion of the second surface connected to the second copper structure has a second distribution area. The second copper structure includes a first shielding layer and a second shielding layer. Moreover, a plurality of distribution holes are formed in the second shielding layer.

In one of the possible or preferred embodiments, the carrier has a plurality of thru-holes penetrating from the first surface to the second surface and includes a plurality of conductive pillars respectively arranged in the thru-holes. The second copper structure includes a circuit layer that is spaced apart from the first shielding layer and the second shielding layer. Two ends of each of the conductive pillars are respectively connected to the second conductive layer and the circuit layer.

In one of the possible or preferred embodiments, the first shielding layer is partially connected to the second shielding layer, and the first shielding layer defines a partial boundary of at least one of the distribution holes.

In one of the possible or preferred embodiments, the distribution holes include a plurality of complete holes and a plurality of incomplete holes. Areas of the complete holes are identical to each other, and an area of each of the incomplete holes is less than the area of any one of the complete holes.

In one of the possible or preferred embodiments, the second copper structure defines a plurality of predetermined hole positions, which include plurality of first positions, a plurality of second positions each having two parts, and a plurality of third positions. The complete holes are respectively formed at the first positions. One of the two parts of each of the second positions is located at the first shielding layer, and another one of the two parts of each of the second positions is formed with one of the incomplete holes. The third positions are located at the first shielding layer.

In one of the possible or preferred embodiments, the predetermined hole positions are spaced apart from each other by a same distance along a first direction, and the predetermined hole positions are spaced apart from each other by the same distance along a second direction perpendicular to the first direction.

In order to solve the above-mentioned problems, yet another one of the technical aspects adopted by the present disclosure is to provide a touch panel, which includes a carrier, a first metal structure, and a second metal structure. The carrier has a first surface and a second surface that is opposite to the first surface. The first metal structure is disposed on the first surface of the carrier. Moreover, a portion of the first surface connected to the first metal structure has a first distribution area. The first metal structure includes a sensing electrode layer and a driving electrode layer that is spaced apart from the sensing electrode layer. The second metal structure is disposed on the second surface of the carrier. Moreover, a portion of the second surface connected to the second metal structure has a second distribution area, and the second metal structure includes a first shielding and a second shielding layer. The first shielding layer has a first density that is defined weight divided by unit area. The second shielding layer has a second density that is defined weight divided by unit area and that is different from the first density.

In one of the possible or preferred embodiments, a plurality of distribution holes are formed in the second shielding layer.

In one of the possible or preferred embodiments, a thickness of the first shielding layer is greater than a thickness of the second shielding layer.

Therefore, the touch panel of the present disclosure can not only be operated normally, but also has a better anti-interference property by using the first shielding layer and the second shielding layer to respectively cooperate with the sensing electrode layer and the driving electrode layer (or the first and second conductive layers). Moreover, the second shielding layer provided by the present disclosure can be formed to precisely control the distribution area of the second metal structure (or the second copper structure) to be close to that of the first metal structure (or the first copper structure) through the distribution holes.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
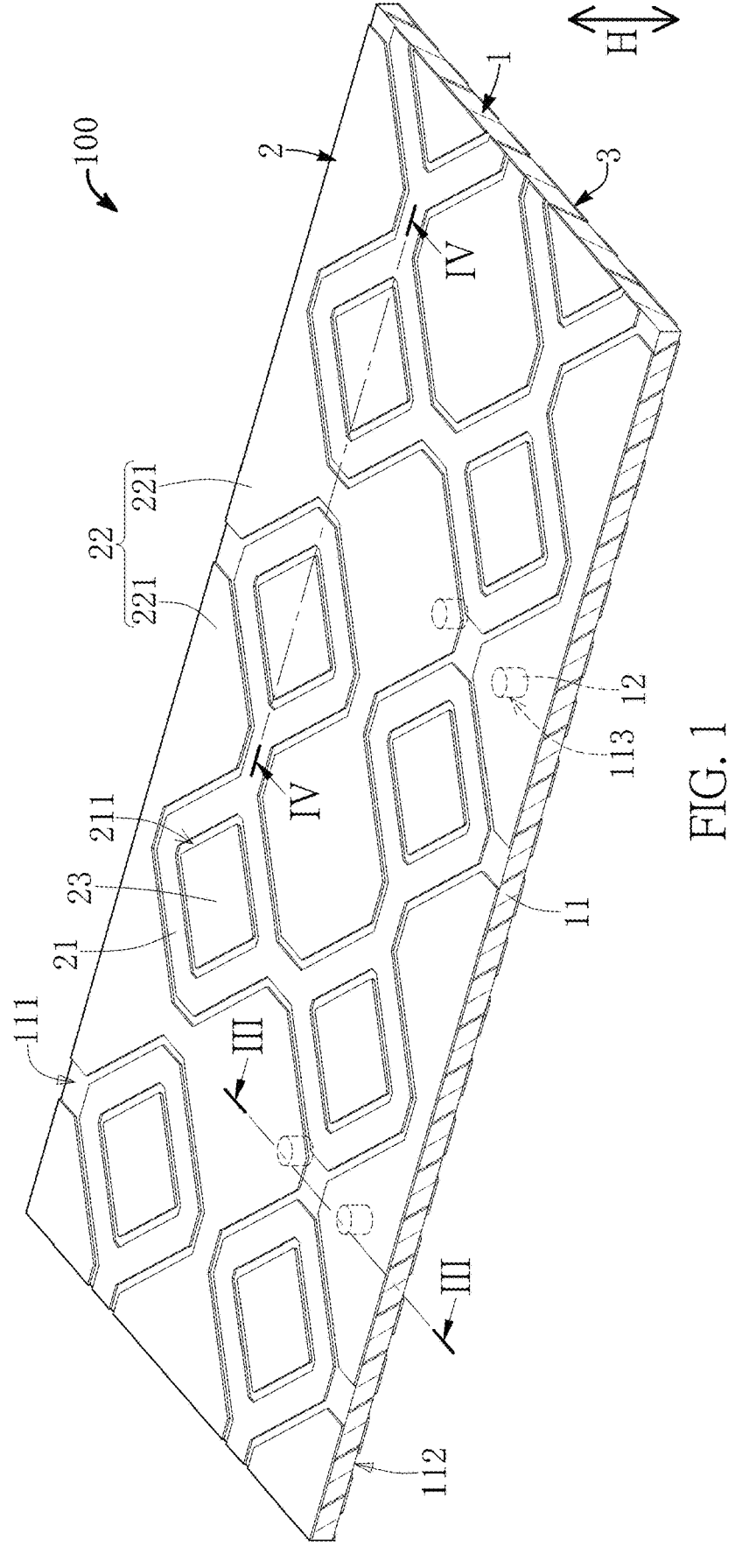
FIG. 1 is a schematic perspective view of a touch panel according to a first embodiment of the present disclosure.
Figure 2:
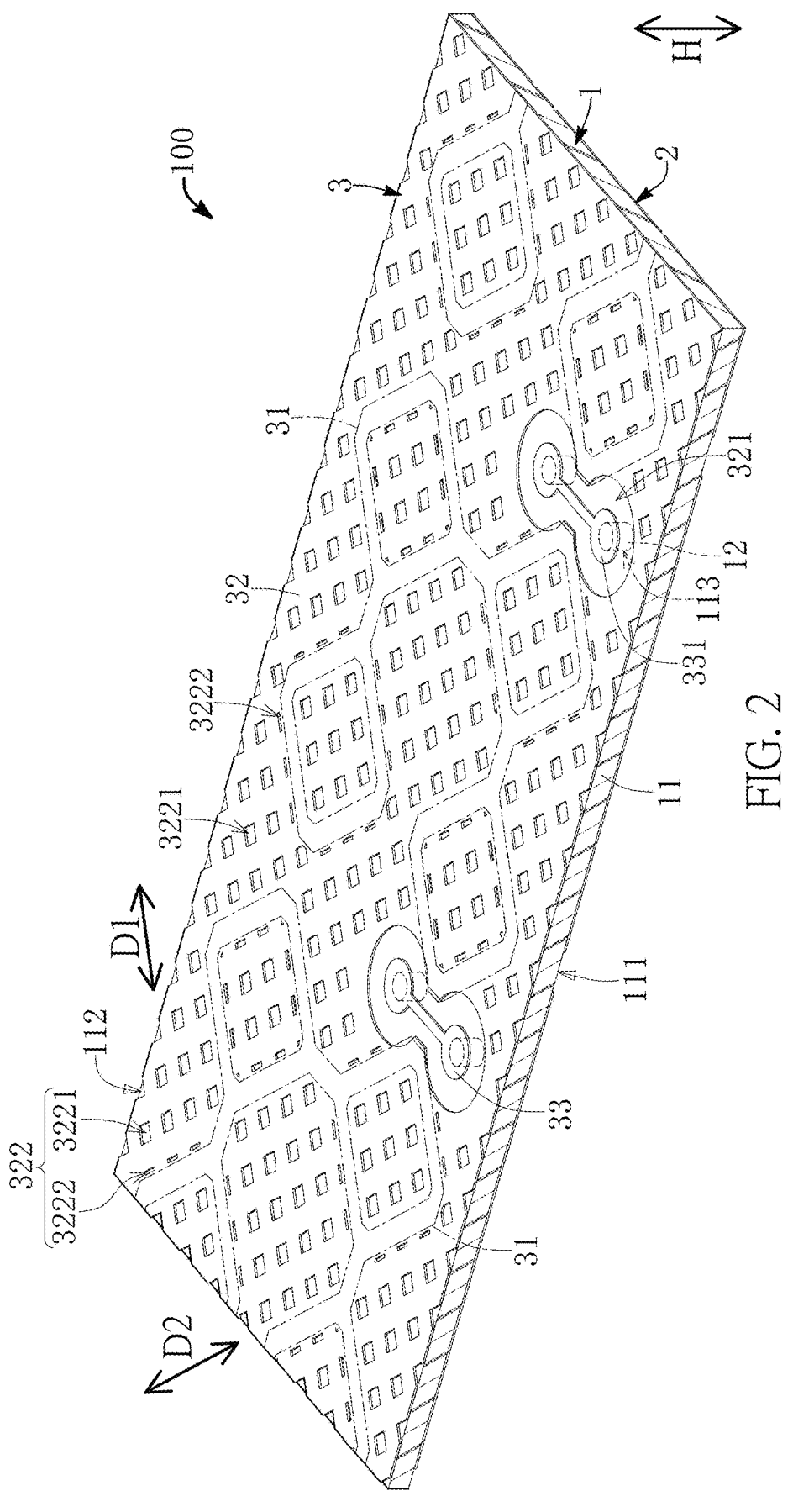
FIG. 2 is a schematic perspective view of FIG. 1 from another angle of view.
Figure 3:
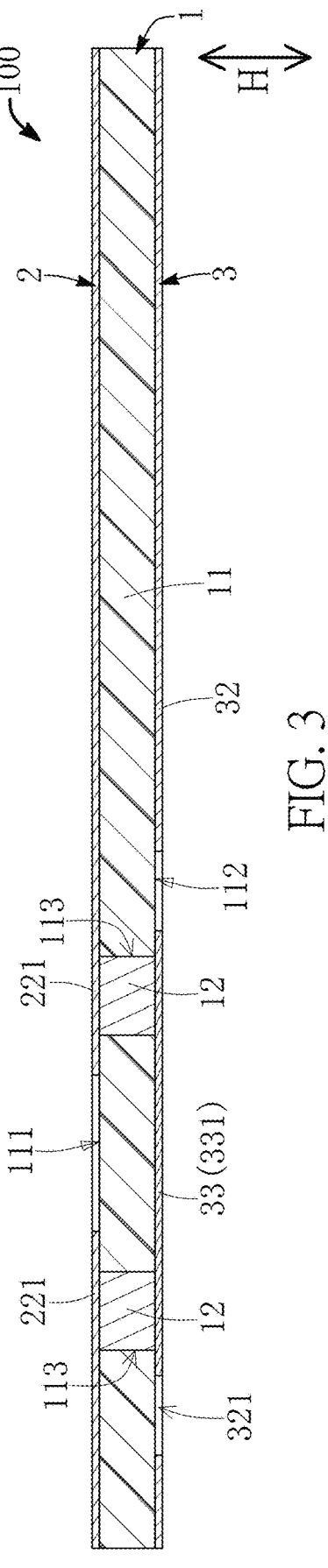
FIG. 3 is a schematic cross-sectional view taken along line III-III of FIG. 1.
Figure 4:
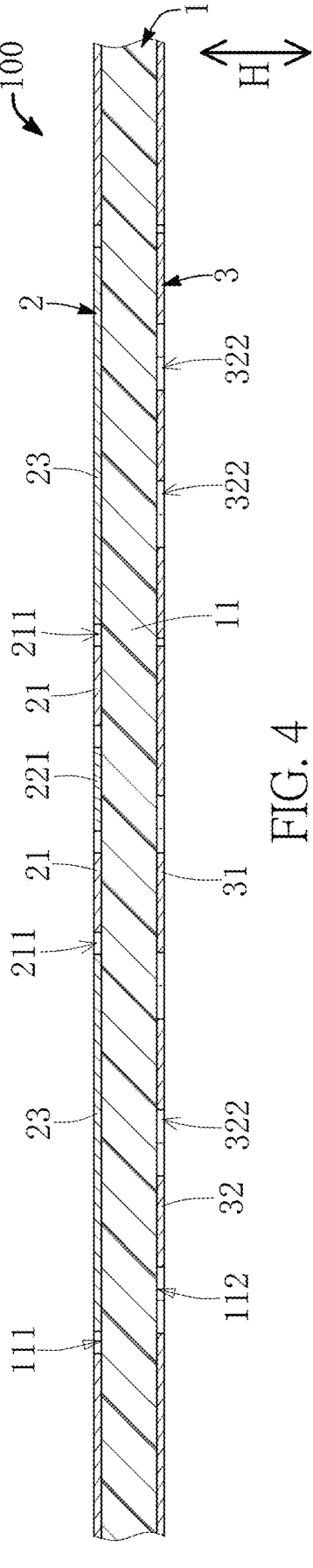
FIG. 4 is a schematic cross-sectional view taken along line IV-IV of FIG. 1.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 7, a first embodiment of the present disclosure is provided. As shown in FIG. 1 to FIG. 4, the present embodiment provides a touch panel 100, which includes a carrier 1, a first metal structure 2 disposed on one side of the carrier 1, and a second metal structure 3 that is disposed on another side of the carrier 1. It should be noted that first metal structure 2 and the second metal structure 3 are preferably made of a same material that can be a copper (i.e., the first metal structure 2 in the present embodiment can be regarded as a first copper structure, and the second metal structure 3 in the present embodiment can be regarded as a second copper structure), but the present disclosure is not limited thereto.

The carrier 1 in the present embodiment includes a board 11 and a plurality of conductive pillars 12 that are embedded in the board 11. The board 11 has a first surface 111 and a second surface 112 that is opposite to the first surface 111. The board 11 has a plurality of thru-holes 113 penetrating from the first surface 111 to the second surface 112 along a thickness direction H, and the conductive pillars 12 are respectively embedded in the thru-holes 113, but the present disclosure is not limited thereto. For example, in other embodiments of the present disclosure not shown in the drawings, the carrier 1 can be provided without the conductive pillars 12.

In the present embodiment, a thickness of the first metal structure 2 along the thickness direction H is equal to a thickness of the second metal structure 3 along the thickness direction H, but the present disclosure is not limited thereto. The first metal structure 2 is disposed on the first surface 111, and a portion of the first surface 111 connected to the first metal structure 2 has a first distribution area. Moreover, the second metal structure 3 is disposed on the second surface 112, and a portion of the second surface 112 connected to the second metal structure 3 has a second distribution area that is within a range from 95% to 105% of the first distribution area.

Furthermore, the first metal structure 2 and the second metal structure 3 are preferably provided with at least part of the following structures or arrangements, such that when the first metal structure 2 and the second metal structure 3 have a substantially same weight, the touch panel 100 can not only be operated normally, but can also have a better anti-interference property.

Figure 5:
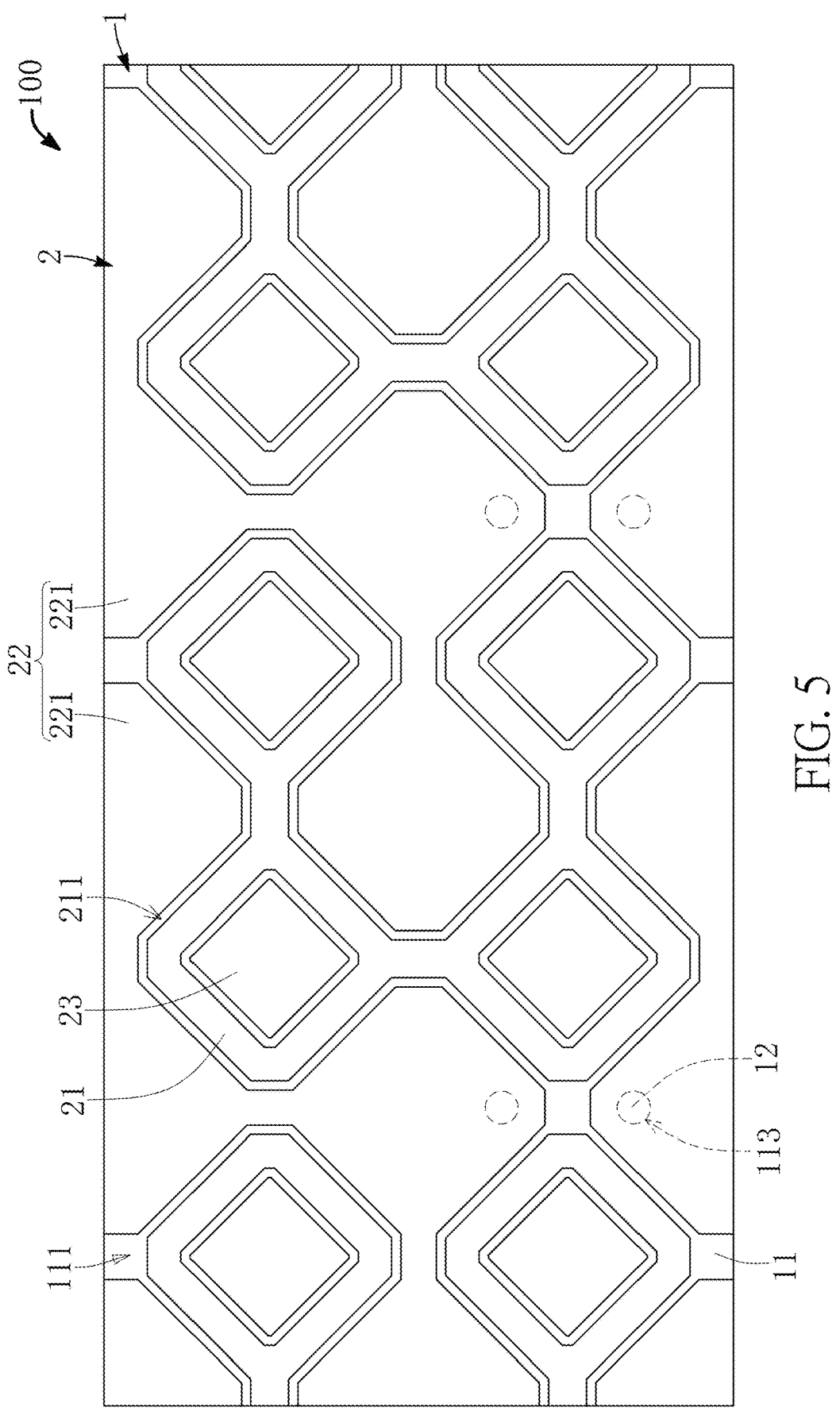
FIG. 5 is a schematic planar view of FIG. 1.
Figure 6:
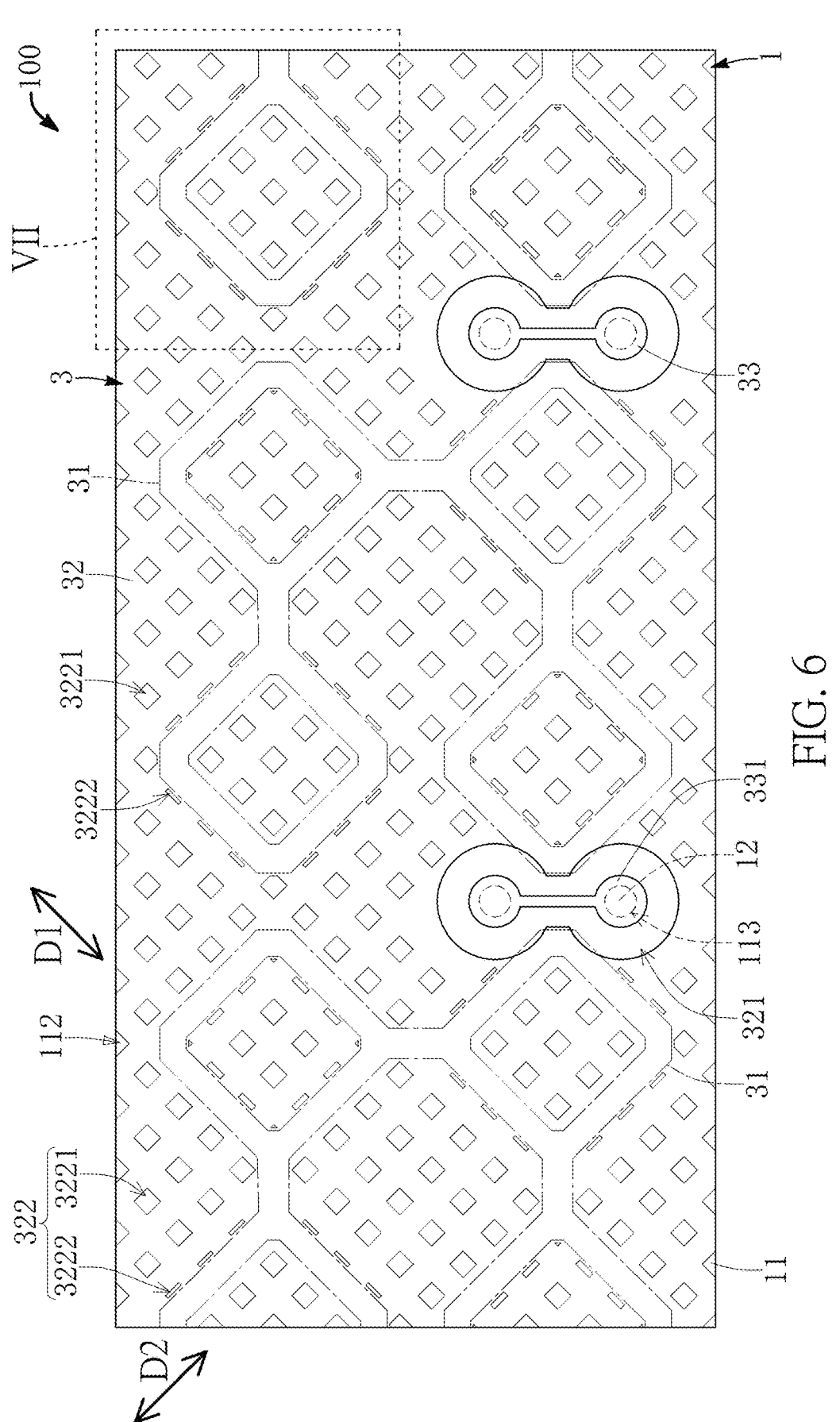
FIG. 6 is a schematic planar view of FIG. 2.
Figure 7:
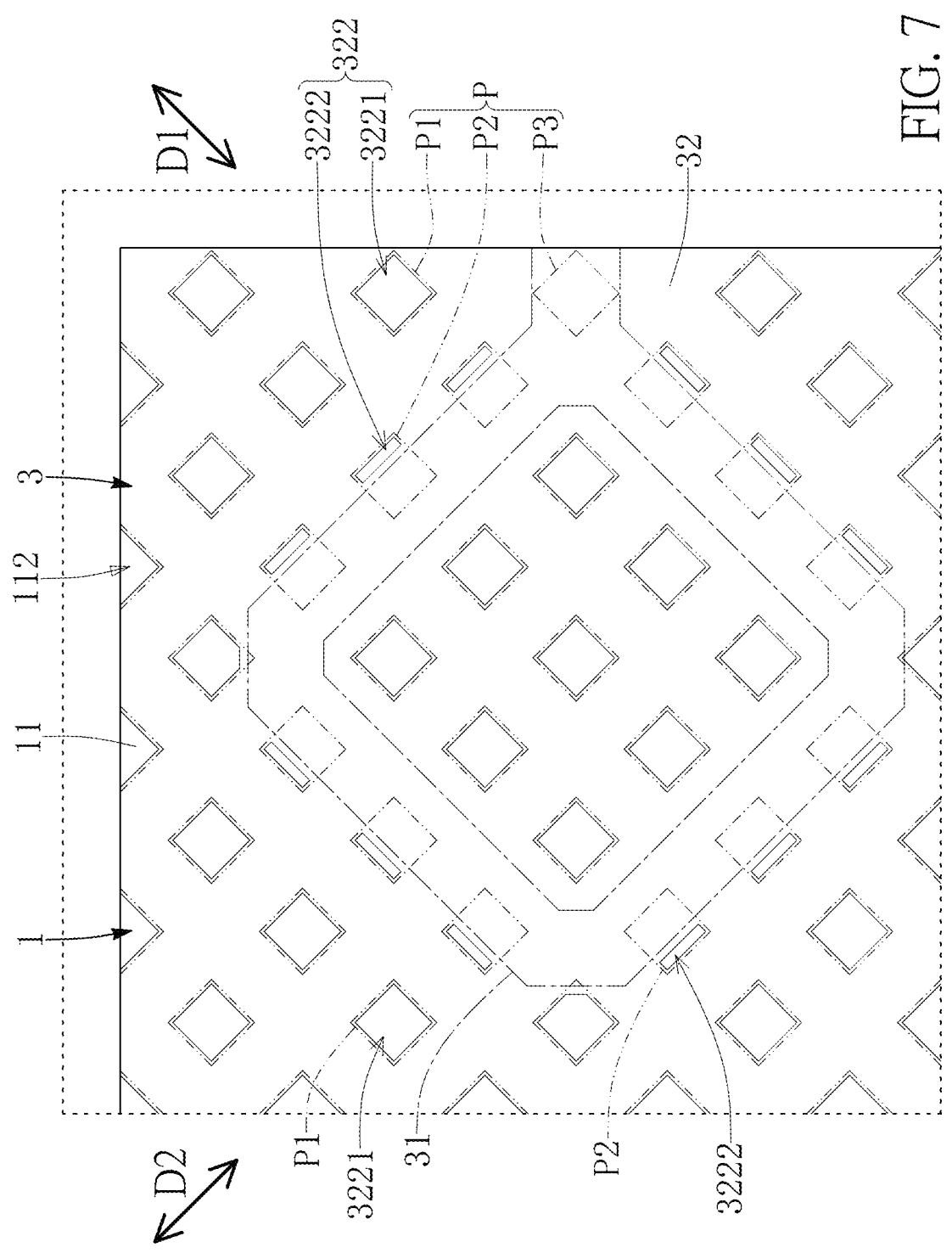
FIG. 7 is a schematic enlarged view of region VII of FIG. 6.

As shown in FIG. 5 to FIG. 7 of the present embodiment, the first metal structure 2 includes a sensing electrode layer 21, a driving electrode layer 22 spaced apart from the sensing electrode layer 21, and a plurality of counterweight pads 23 that are surrounded by the sensing electrode layer 21. It should be noted that the sensing electrode layer 21 and the driving electrode layer 22 can be adjusted or changed according to practical requirements. In other words, the sensing electrode layer 21 in the present embodiment can be regarded as a first conductive layer, and the driving electrode layer 22 in the present embodiment can be regarded as a second conductive layer. In addition, in other embodiments of the present disclosure not shown in the drawings, the first metal structure 2 can be provided without the counterweight pads 23 according to practical requirements.

Specifically, the sensing electrode layer 21 defines a plurality of enclosed regions 211 that are surrounded thereby and that are spaced apart from each other. The counterweight pads 23 are respectively arranged in the enclosed regions 211, and each of the counterweight pads 23 is not in contact with the sensing electrode layer 21. Moreover, the driving electrode layer 22 includes a plurality of driving electrodes 221 spaced apart from each other. Each of the driving electrodes 221 is surrounded by the sensing electrode layer 21, and the driving electrodes 221 and the counterweight pads 23 are separated from each other through the sensing electrode layer 21.

The second metal structure 3 in the present embodiment includes a first shielding layer 31, a second shielding layer 32, and a circuit layer 33 that is spaced apart from the first shielding layer 31 and the second shielding layer 32, but the present disclosure is not limited thereto. For example, in other embodiments of the present disclosure not shown in the drawings, the circuit layer 33 of the second metal structure 3 can be omitted or can be replaced by other components according to practical requirements.

Moreover, a first projection region defined by orthogonally projecting the first shielding layer 31 onto the first metal structure 2 along the thickness direction H is overlapped with M % of area of the sensing electrode layer 21. Specifically, M is a positive number that is preferably within a range from 95 to 100. In other words, an area of the first shielding layer 31 can be greater than, equal to, or slightly less than the area of the sensing electrode layer 21. It should be noted that the shape of the first shielding layer 31 in the present embodiment is substantially identical to the shape of the sensing electrode layer 21, but the present disclosure is not limited thereto.

In addition, a second projection region defined by orthogonally projecting the second shielding layer 32 onto the first metal structure 2 along the thickness direction H is overlapped with N % of area of the driving electrode layer 22. Specifically, N is a positive number and is different from M, and M is preferably greater than N, but the present disclosure is not limited thereto. In the present embodiment, a portion of the second metal structure 3 other than the first shielding layer 31 and the circuit layer 33 is defined as the second shielding layer 32, and an area of the second shielding layer 32 is greater than the area of the first shielding layer 31.

Moreover, the second shielding layer 32 has a plurality of isolation holes 321 formed therein. The circuit layer 33 includes a plurality of connection circuits 331, and each of the connection circuits 331 is arranged in one of the isolation holes 321 for being spaced apart from the first shielding layer 31 and the second shielding layer 32. Specifically, two ends of each of the conductive pillars 12 are respectively connected to the driving electrode layer 22 and the circuit layer 33. In the present embodiment, each of the conductive pillars 12 is connected to one of the driving electrodes 221, and each of the connection circuits 331 is connected to two of the conductive pillars 12 so as to electrically couple two of the driving electrodes 221 that are connected to the two of the conductive pillars 12.

The second shielding layer 32 of the present embodiment is provided with a specific shape that is described in the following description, such that when the first metal structure 2 and the second metal structure 3 have a substantially same weight, the touch panel 100 can not only be operated normally, but also has a better anti-interference property; however, the present disclosure is not limited thereto.

Specifically, the second shielding layer 32 has a plurality of distribution holes 322 formed therein, so that the second distribution area can be maintained to be within a range from 95% to 105% of the first distribution area. In other words, the second metal structure 3 can be formed to precisely control the second distribution area by adjusting the quantity and the total area of the distribution holes 322. In other words, the distribution holes 322 provided by the present embodiment can be regarded as a counterweight hole 322.

Moreover, the distribution holes 322 of the second shielding layer 32 have a substantially same shape and are in a regular arrangement (e.g., each of the driving electrodes 221 corresponds in position to at least one of the distribution holes 322 along the thickness direction H, and each of the counterweight pads 23 corresponds in position to at least one of the distribution holes 322 along the thickness direction H), and each of the distribution holes 322 in the present embodiment has a substantially rectangular shape or a substantially square shape, but the present disclosure is not limited thereto. For example, in other embodiments of the present disclosure not shown in the drawings, the distribution holes 322 can have different shapes or different areas according to practical requirements; or, the shape of the distribution hole 322 can be different from the rectangular shape and the square shape.

Specifically, the distribution holes 322 in the present embodiment include a plurality of complete holes 3221 and a plurality of incomplete holes 3222. Moreover, shapes and areas of the complete holes 3221 are identical to each other, shapes and areas of the incomplete holes 3222 can be different from each other according to positions of the incomplete holes 3222, and the area of each of the incomplete holes 3222 is less than the area of any one of the complete holes 3221. In other words, the shape of each of the incomplete holes 3222 is a part of the shape of the complete hole 3221. Moreover, the first shielding layer 31 is partially connected to the second shielding layer 32, and the first shielding layer 31 defines a boundary of at least one of the distribution holes 322 (e.g., a partial boundary of any one of the incomplete holes 3222 can be defined by the first shielding layer 31).

In order to facilitate scheduling of the positions of the distribution holes 322, the second metal structure 3 defines a plurality of predetermined hole positions P. The predetermined hole positions P are spaced apart from each other by a same distance along a first direction D1, and the predetermined hole positions P are spaced apart from each other by a same distance along a second direction D2 perpendicular to the first direction D1. In the present embodiment, the first direction D1 (or the second direction D2) and any one of the connection circuits 331 have an acute angle therebetween that is within a range from 30 degrees to 60 degrees (e.g., the acute angle can be 45 degrees), and the predetermined hole positions P are uniformly distributed on the second metal structure 3, thereby allowing the distribution holes 322 to be selectively formed thereon. However, in other embodiments of the present disclosure not shown in the drawings, a distance between any two of the predetermined hole positions P adjacent to each other along the first direction D1 can be different from a distance between any two of the predetermined hole positions P adjacent to each other along the second direction D2.

In other words, the predetermined hole positions P can be further defined or distinguished according to the type of the distribution holes 322 or whether the distribution holes 322 are formed thereon. In the present embodiment, the predetermined hole positions P include a plurality of first positions P1, a plurality of second positions P2 each having two parts, and a plurality of third positions P3. The complete holes 3221 are respectively formed at the first positions P1. One of the two parts of each of the second positions P2 is located at the first shielding layer 31, and another one of the two parts of each of the second positions P2 is formed with one of the incomplete holes 3222. Moreover, the third positions P3 are located at the first shielding layer 31. In other words, the distribution holes 322 are not allowed to be formed at the third positions P3.

In addition, as shown in FIG. 1 to FIG. 7, the first shielding layer 31 and the second shielding layer 32 have the same thickness, the first shielding layer 31 has a first density that is defined weight divided by unit area, the second shielding layer 32 has a second density that is defined weight divided by unit area, and the second density is different from the first density through the distribution holes 322 formed in the second shielding layer 32, but the present disclosure is not limited.

Figure 8:
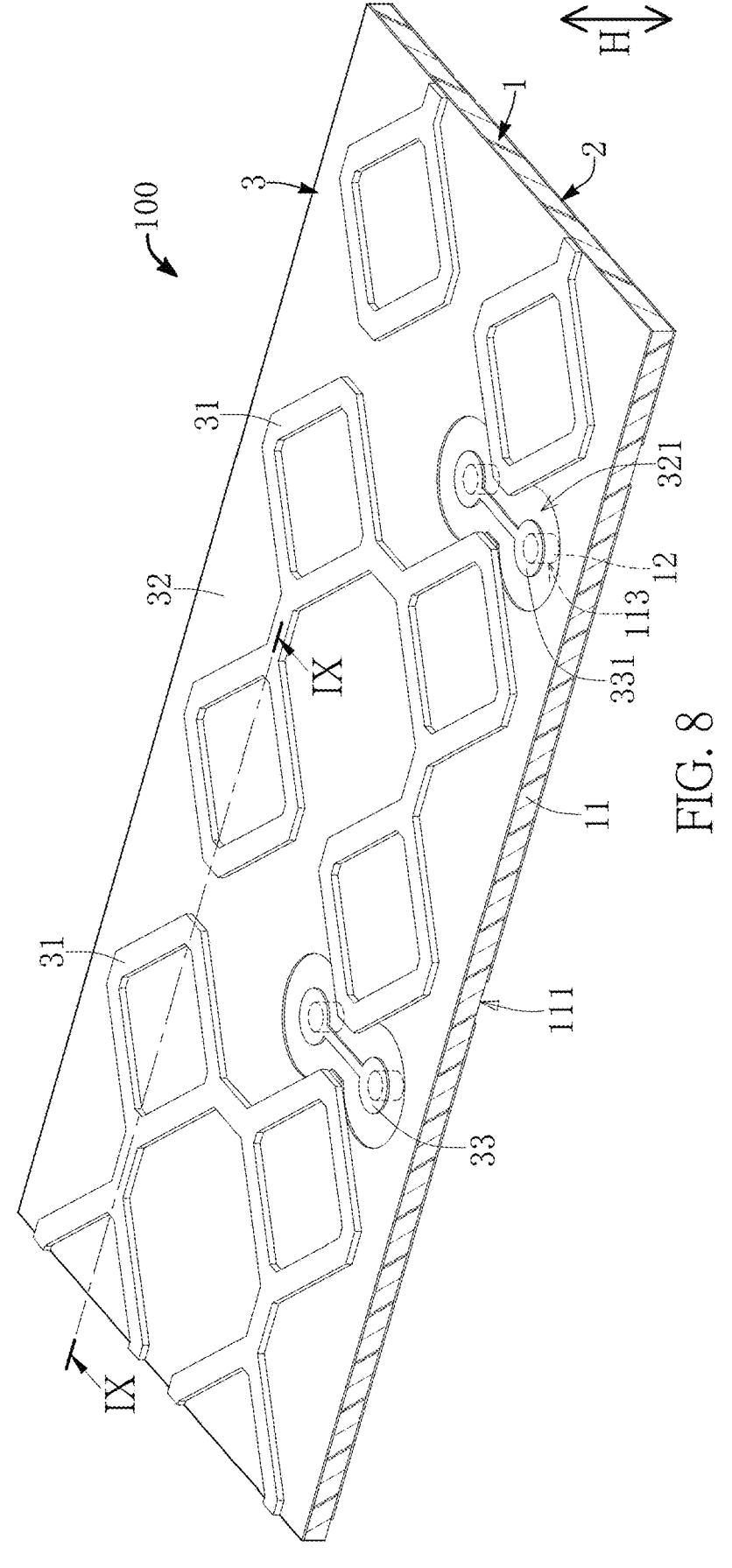
FIG. 8 is a schematic perspective view of the touch panel according to a second embodiment of the present disclosure.
Figure 9:
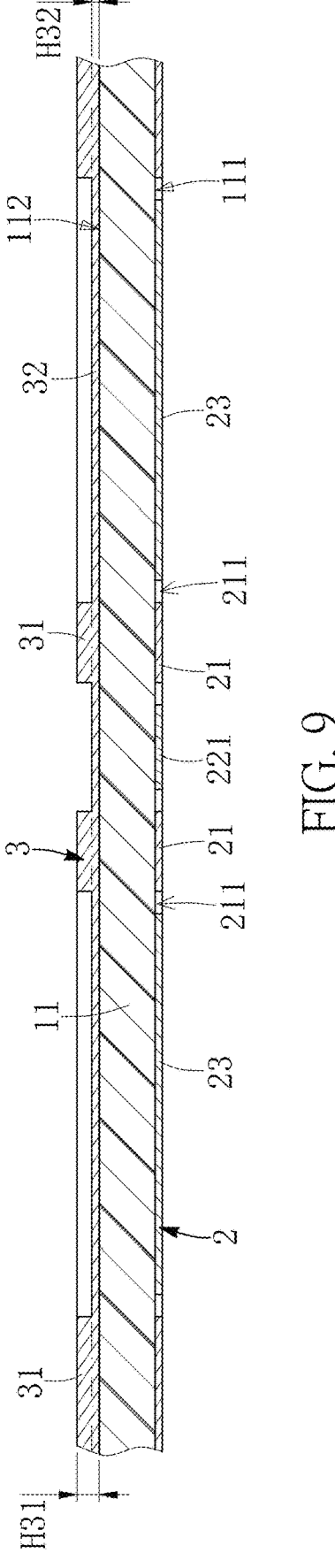
FIG. 9 is a schematic cross-sectional view taken along line IX-IX of FIG. 8.

For example, please referring to FIG. 8 and FIG. 9, a second embodiment of the present disclosure is provided. The second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the second embodiment, the second shielding layer 32 is formed without the distribution holes 322, and a thickness H31 of the first shielding layer 31 is greater than a thickness H32 of the second shielding layer 32, thereby achieving the second density of the second shielding layer 32 is different from the first density of the first shielding layer 31.

BENEFICIAL EFFECTS OF THE EMBODIMENT

In conclusion, the touch panel of the present disclosure can not only be operated normally, but also has a better anti-interference property by using the first shielding layer and the second shielding layer to respectively cooperate with the sensing electrode layer and the driving electrode layer (or the first and second conductive layers). Moreover, the second shielding layer can be formed to precisely control the distribution area of the second metal structure (or the second copper structure) to be close to that of the first metal structure (or the first copper structure) through the distribution holes.

In addition, the second shielding layer of the touch panel in the present disclosure can be provided to pre-schedule the arrangement of the distribution holes through the predetermined hole positions, such that a covering density of the second shielding layer can be controlled for having a better anti-interference property.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A touch panel, comprising:
a carrier having a first surface and a second surface that is opposite to the first surface;
a first metal structure disposed on the first surface of the carrier, wherein a portion of the first surface connected to the first metal structure has a first distribution area, and wherein the first metal structure includes a sensing electrode layer and a driving electrode layer that is spaced apart from the sensing electrode layer; and
a second metal structure disposed on the second surface of the carrier, wherein a portion of the second surface connected to the second metal structure has a second distribution area, and wherein the second metal structure includes:
a first shielding layer; and
a second shielding layer, wherein the second shielding layer has a plurality of distribution holes that are recessed therein and that are arranged above the carrier.

2. The touch panel according to claim 1, wherein the carrier has a plurality of thru-holes penetrating from the first surface to the second surface and includes a plurality of conductive pillars respectively arranged in the thru-holes, wherein the second metal structure includes a circuit layer that is spaced apart from the first shielding layer and the second shielding layer, and wherein two ends of each of the conductive pillars are respectively connected to the driving electrode layer and the circuit layer.

3. The touch panel according to claim 2, wherein the driving electrode layer includes a plurality of driving electrodes spaced apart from each other, and each of the conductive pillars is connected to one of the driving electrodes, and wherein the circuit layer includes a plurality of connection circuits, and each of the connection circuits is connected to two of the conductive pillars so as to electrically couple two of the driving electrodes that are connected to the two of the conductive pillars.

4. The touch panel according to claim 3, wherein a plurality of isolation holes are formed in the second shielding layer, and each of the connection circuits is arranged in one of the isolation holes so as to be spaced apart from the first shielding layer and the second shielding layer.

5. The touch panel according to claim 1, wherein the first shielding layer is partially connected to the second shielding layer, and the first shielding layer defines a partial boundary of at least one of the distribution holes.

6. The touch panel according to claim 1, wherein the first metal structure and the second metal structure are made of a same material, and a thickness of the first metal structure along the thickness direction is equal to a thickness of the second metal structure along the thickness direction.

7. The touch panel according to claim 1, wherein the sensing electrode layer defines a plurality of enclosed regions that are spaced apart from each other, and the first metal structure includes a plurality of counterweight pads respectively arranged in the enclosed regions, and wherein each of the counterweight pads is not in contact with the sensing electrode layer, and each of the counterweight pads corresponds in position to at least one of the distribution holes along the thickness direction.

8. The touch panel according to claim 1, wherein the distribution holes include a plurality of complete holes and a plurality of incomplete holes, and wherein areas of the complete holes are identical to each other, and an area of each of the incomplete holes is less than the area of any one of the complete holes.

9. The touch panel according to claim 8, wherein the second metal structure defines a plurality of predetermined hole positions including:

a plurality of first positions, wherein the complete holes are respectively formed at the first positions;

a plurality of second positions each having two parts, wherein one of the two parts of each of the second positions is located at the first shielding layer, and another one of the two parts of each of the second positions is formed with one of the incomplete holes; and a plurality of third positions located at the first shielding layer.

10. The touch panel according to claim 9, wherein the predetermined hole positions are spaced apart from each other by a same distance along a first direction, and the predetermined hole positions are spaced apart from each other by the same distance along a second direction perpendicular to the first direction.

11. A touch panel, comprising:

a carrier having a first surface and a second surface that is opposite to the first surface;

a first copper structure disposed on the first surface of the carrier, wherein, a portion of the first surface connected to the first copper structure has a first distribution area, and wherein the first copper structure includes a first conductive layer and a second conductive layer that is spaced apart from the first conductive layer; and a second copper structure disposed on the second surface of the carrier, wherein, a portion of the second surface connected to the second copper structure has a second distribution area, and wherein the second copper structure includes:

a first shielding layer; and a second shielding layer, wherein the second shielding layer has a plurality of distribution holes that are recessed therein and that are arranged above the carrier.

12. The circuit board according to claim 11, wherein the carrier has a plurality of thru-holes penetrating from the first surface to the second surface and includes a plurality of conductive pillars respectively arranged in the thru-holes, and wherein the second copper structure includes a circuit layer that is spaced apart from the first shielding layer and the second shielding layer, and wherein two ends of each of the conductive pillars are respectively connected to the second conductive layer and the circuit layer.

13. The circuit board according to claim 11, wherein the first shielding layer is partially connected to the second shielding layer, and the first shielding layer defines a partial boundary of at least one of the distribution holes.

14. The circuit board according to claim 11, wherein the distribution holes include a plurality of complete holes and a plurality of incomplete holes, and wherein areas of the complete holes are identical to each other, and an area of each of the incomplete holes is less than the area of any one of the complete holes.

15. The circuit board according to claim 14, wherein the second copper structure defines a plurality of predetermined hole positions including:

a plurality of first positions, wherein the complete holes are respectively formed at the first positions;

a plurality of second positions each having two parts, wherein one of the two parts of each of the second positions is located at the first shielding layer, and another one of the two parts of each of the second positions is formed with one of the incomplete holes; and a plurality of third positions located at the first shielding layer.

16. The circuit board according to claim 15, wherein the predetermined hole positions are spaced apart from each other by a same distance along a first direction, and the predetermined hole positions are spaced apart from each other by the same distance along a second direction perpendicular to the first direction.

17. A touch panel, comprising:

a carrier having a first surface and a second surface that is opposite to the first surface;

a first metal structure disposed on the first surface of the carrier, wherein a portion of the first surface connected to the first metal structure has a first distribution area, and wherein the first metal structure includes a sensing electrode layer and a driving electrode layer that is spaced apart from the sensing electrode layer; and a second metal structure disposed on the second surface of the carrier, wherein a portion of the second surface connected to the second metal structure has a second distribution area, and wherein the second metal structure includes:

a first shielding layer having a first density that is defined weight divided by unit area; and a second shielding layer having a second density that is defined weight divided by unit area and that is different from the first density, wherein the second shielding layer has a plurality of distribution holes that are recessed therein and that are arranged above the carrier.

18. The touch panel according to claim 17, wherein a thickness of the first shielding layer is greater than a thickness of the second shielding layer.

\*    \*    \*    \*    \*